(12) United States Patent
Kazuno et al.

(10) Patent No.: US 11,162,180 B2
(45) Date of Patent: Nov. 2, 2021

(54) HYDROGEN STATION

(71) Applicant: HONDA MOTOR CO., LTD., Tokyo (JP)

(72) Inventors: Shuichi Kazuno, Wako (JP); Takeo Fukuda, Wako (JP); Jun Takeuchi, Wako (JP); Hisashi Nagaoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 16/502,065

(22) Filed: Jul. 3, 2019

(65) Prior Publication Data
US 2020/0010966 A1    Jan. 9, 2020

(30) Foreign Application Priority Data

Jul. 5, 2018  (JP) .............................. JP2018-127996

(51) Int. Cl.
*C25B 15/02* (2021.01)
*C25B 1/04* (2021.01)

(52) U.S. Cl.
CPC ................ *C25B 15/02* (2013.01); *C25B 1/04* (2013.01)

(58) Field of Classification Search
None
See application file for complete search history.

(56) References Cited

U.S. PATENT DOCUMENTS

| 4,857,158 A | * | 8/1989 | Cawlfield | ................. C25B 1/14 204/228.3 |
| 4,879,647 A | * | 11/1989 | Yazawa | ............... G06F 11/0757 714/55 |
| 5,711,865 A | * | 1/1998 | Caesar | ...................... C25B 1/04 205/628 |

(Continued)

FOREIGN PATENT DOCUMENTS

| JP | 2008/262740 | * 10/2008 | ............. Y02E 60/50 |
| JP | 2010-236673 | 10/2010 | |

(Continued)

OTHER PUBLICATIONS

Ibrahim et al, Hydrogen Generation from Electrolysis Final Technical Report, Teledyne Energy Systems, Inc., Jul. 2008, pp. 1-83 (obtained at http://osti.gov/biblio/956328) (Year: 2008).*

*Primary Examiner* — Harry D Wilkins, III
(74) *Attorney, Agent, or Firm* — Amin, Turocy & Watson, LLP

(57) ABSTRACT

A hydrogen station includes a state management apparatus that is connected to each of a plurality of systems and manages the states of the plurality of systems, and a safety control apparatus that is formed separately from the main equipment and is connected to the state management apparatus. The state management apparatus performs first watchdog control to check operations of the plurality of systems and the safety control apparatus performs second watchdog control to check an operation of the state management apparatus. The state management apparatus or the safety control apparatus cuts off the power supply from the safety control apparatus to the main equipment if an abnormality is recognized by the second watchdog control, even if the first watchdog control indicates correct operation.

7 Claims, 5 Drawing Sheets

(56) References Cited

U.S. PATENT DOCUMENTS

| | | | | |
|---|---|---|---|---|
| 6,432,283 | B1* | 8/2002 | Fairlie | F17C 5/06 |
| | | | | 204/230.2 |
| 2005/0186458 | A1* | 8/2005 | Rusta-Sallehy | C25B 1/06 |
| | | | | 204/228.5 |
| 2007/0138006 | A1* | 6/2007 | Oakes | H01M 8/0606 |
| | | | | 204/278 |
| 2007/0246624 | A1* | 10/2007 | Lin | G06F 1/1632 |
| | | | | 248/231.9 |
| 2010/0114395 | A1* | 5/2010 | Hinatsu | H02J 3/381 |
| | | | | 700/295 |
| 2010/0276031 | A1 | 11/2010 | Saiki et al. | |
| 2012/0298520 | A1* | 11/2012 | Takeuchi | C25B 15/08 |
| | | | | 205/335 |
| 2013/0037165 | A1 | 2/2013 | Okawachi et al. | |
| 2015/0060294 | A1* | 3/2015 | Prescott | H01M 8/0656 |
| | | | | 205/338 |
| 2015/0218722 | A1* | 8/2015 | Garces Baron | C23F 13/22 |
| | | | | 205/337 |
| 2016/0068976 | A1* | 3/2016 | Yoshida | C25B 1/08 |
| | | | | 204/265 |
| 2018/0205102 | A1* | 7/2018 | O'Brien | F17C 5/06 |

FOREIGN PATENT DOCUMENTS

| | | |
|---|---|---|
| JP | 2011-231799 | 11/2011 |
| JP | 2012-210081 | 10/2012 |
| JP | 2018-35901 | 3/2018 |

* cited by examiner

HYDROGEN STATION

CROSS-REFERENCE TO RELATED APPLICATION

This application is based upon and claims the benefit of priority from Japanese Patent Application No. 2018-127996 filed on Jul. 5, 2018, the contents of which are incorporated herein by reference.

BACKGROUND OF THE INVENTION

Field of the Invention

The present invention relates to a hydrogen station that handles hydrogen.

Description of the Related Art

As equipment for handling hydrogen, a hydrogen station includes a hydrogen production system that produces hydrogen, a pressure storage system that stores the produced hydrogen, and a hydrogen supply system that supplies the stored hydrogen to a fuel cell automobile or the like, for example. Furthermore, Japanese Laid-Open Patent Publication No. 2018-035901 discloses a hydrogen station that includes a hydrogen filling station (hydrogen supply system) that fills a fuel cell automobile with hydrogen and a filling management apparatus that performs allocation or the like of hydrogen filling apparatuses. In this case, the filling management apparatus is configured to receive information concerning the operating conditions of a plurality of hydrogen filling apparatuses, select a hydrogen filling apparatus to supply hydrogen when a fuel cell automobile arrives, and provide information based on this selection.

SUMMARY OF THE INVENTION

However, since a hydrogen station handles hydrogen, the hydrogen station must be able to properly deal with a situation where abnormalities occur in the equipment. For example, in a case where the hydrogen station includes a plurality of systems (the plurality of hydrogen filling apparatuses disclosed in Japanese Laid-Open Patent Publication No. 2018-035901, or a hydrogen production system, pressure storage system, and the like forming a hydrogen station), there is a demand for the hydrogen station to be capable of preventing hydrogen leaks in each system.

The present invention aims to solve the above problem, and it is an objective of the present invention to provide a hydrogen station that can take suitable measures when an abnormality occurs in a system of equipment that includes a plurality of systems for handling hydrogen.

In order to achieve this objective, one aspect of the present invention is a hydrogen station that includes main equipment having a plurality of systems that handle hydrogen, the hydrogen station comprising a state management apparatus connected to each of the plurality of systems and configured to manage the states of the plurality of systems; and a safety control apparatus formed separately from the main equipment, connected to the state management apparatus, and configured to supply power to the main equipment, wherein the state management apparatus is configured to perform first watchdog control to check operations of the plurality of systems, and the safety control apparatus is configured to perform second watchdog control to check an operation of the state management apparatus, and the state management apparatus or the safety control apparatus is configured to cut off the power supply from the safety control apparatus to the main equipment if an abnormality is recognized by the second watchdog control, even if the first watchdog control indicates correct operation.

According to the present invention, when an abnormality is recognized in the state management apparatus by the safety control apparatus, the hydrogen station cuts off the power supply to the main equipment, even if the state management apparatus recognizes that the plurality of systems are operating correctly. In other words, if the state management apparatus that manages the state of each system handling the hydrogen is not operating correctly, the hydrogen station forcefully stops the operation of the main equipment, since the reliability of the state management of each system cannot be ensured. In this way, the hydrogen station makes it possible to prohibit the production, supply, and the like of hydrogen, thereby enabling suitable measures such as decreasing the possibility of hydrogen leaking to the outside, preventing electrical contact with the hydrogen in the main equipment, and the like.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The following describes examples of preferred embodiments of the present invention, while referencing the accompanying drawings.

Figure 1:
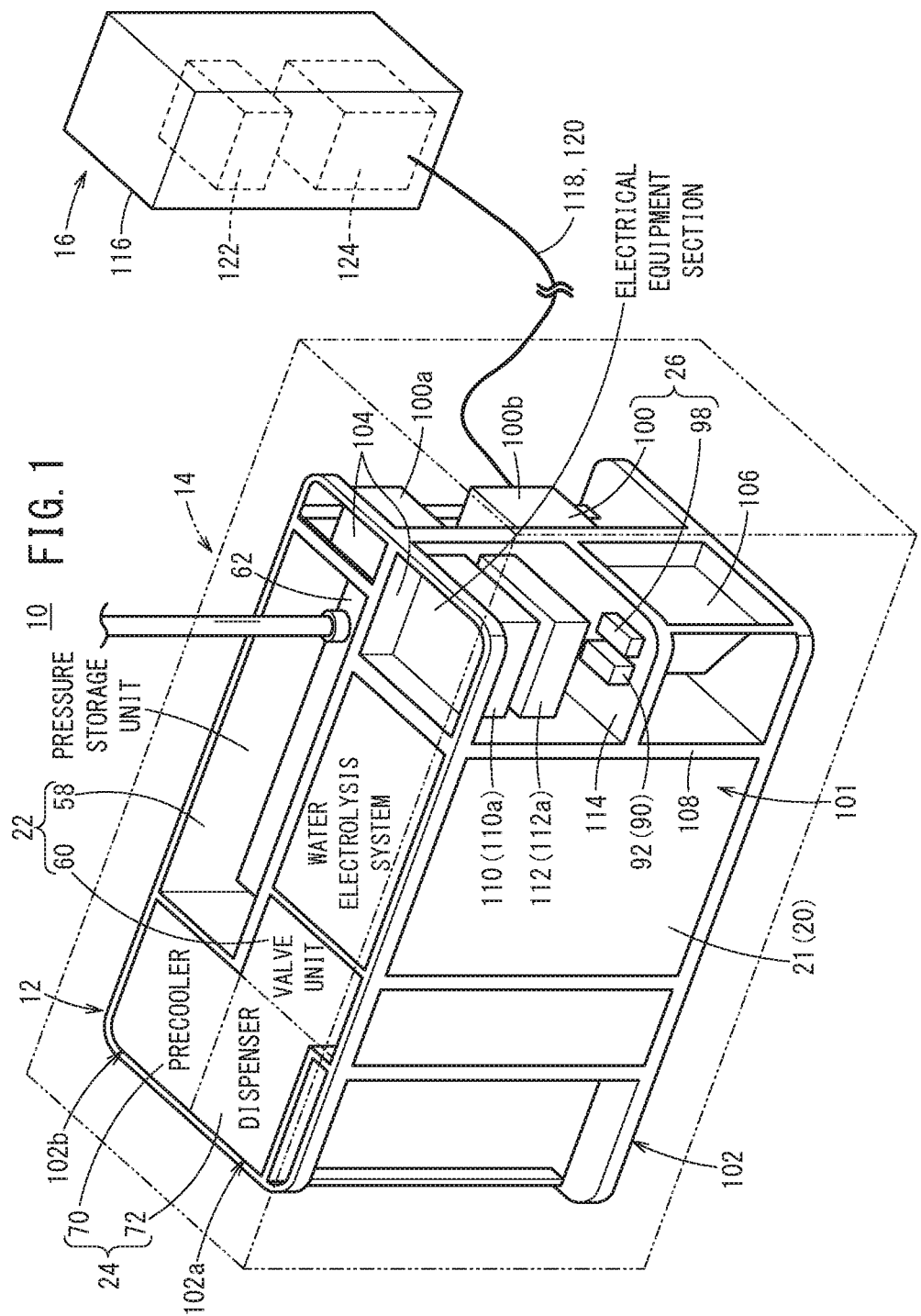
FIG. 1 is a perspective diagram schematically showing an overall configuration of a hydrogen station according to an embodiment of the present invention.

As shown in FIG. 1, a hydrogen station 10 according to an embodiment of the present invention includes main equipment 12 that handles hydrogen inside a facility 14 (housing), and includes safety equipment 16 that supplies power to the main equipment 12 outside of the facility 14. This hydrogen station 10 supplies hydrogen, as a fuel gas, to a fuel cell vehicle (target object) not shown in the drawings, for example. Therefore, a filling nozzle 18 (see FIG. 2) that is inserted into the fuel inlet of the fuel cell automobile is provided at a predetermined position outside the facility 14.

Figure 2:
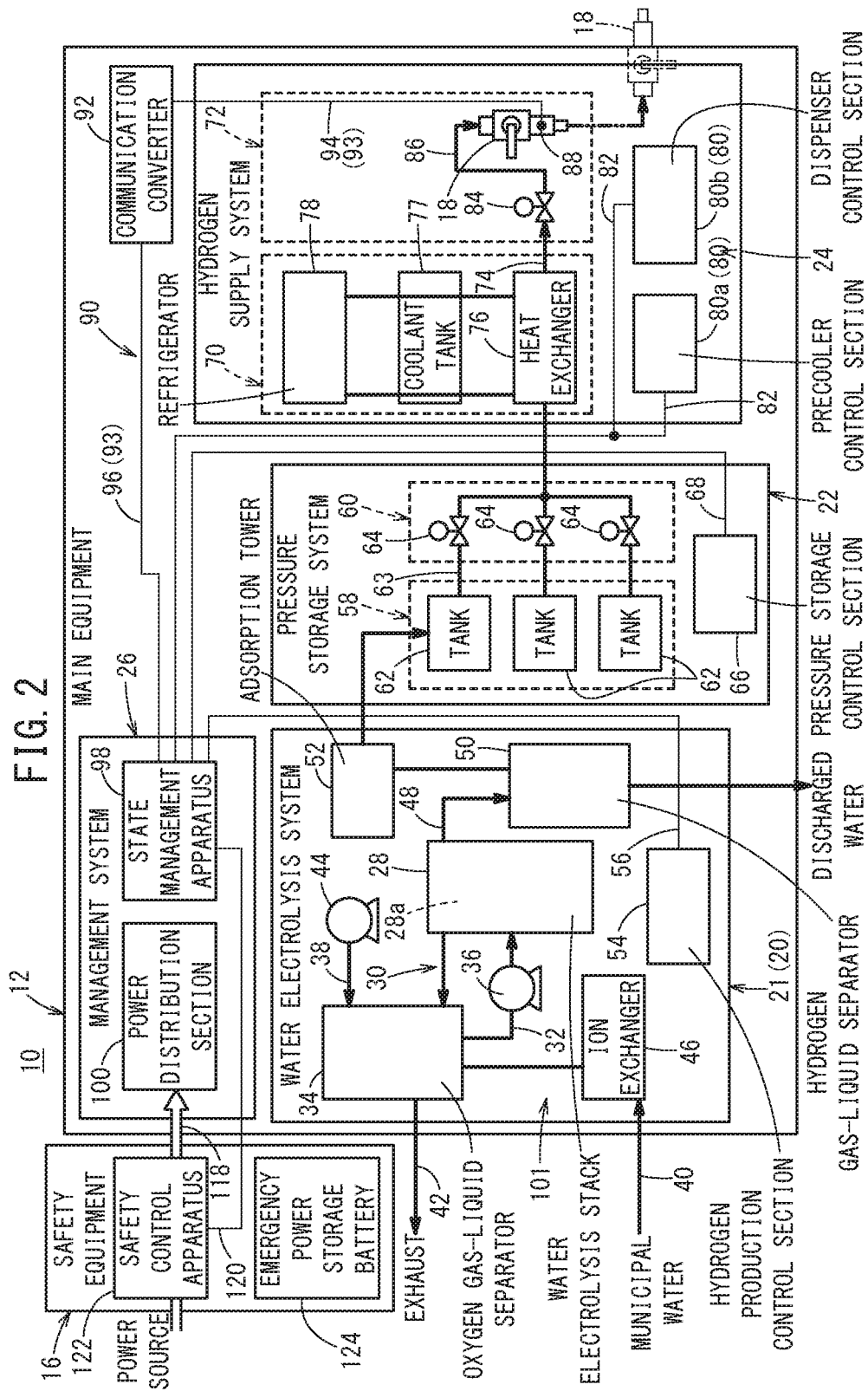
FIG. 2 is a block diagram showing the flow up to the production and supply of the hydrogen by the hydrogen station of FIG. 1.

As shown in FIG. 1 and FIG. 2, the main equipment 12 includes a hydrogen production system 20 that produces hydrogen, a pressure storage system 22 that stores the produced hydrogen, and a hydrogen supply system 24 that supplies the hydrogen stored in the pressure storage system 22 to the fuel cell automobile. The main equipment 12 also includes a management system 26 that manages the state of each system and also distributes power to each system.

In the present embodiment, the hydrogen production system 20 adopts a water electrolysis system 21 (high-pressure water electrolysis system) that produces hydrogen by electrolyzing water. The hydrogen production system 20 can obviously adopt various systems capable of generating hydrogen.

The water electrolysis system 21 includes a water electrolysis stack 28 that generates hydrogen (high-pressure hydrogen) with a pressure, e.g., 1 MPa to 70 MPa, that is higher than the normal pressure of oxygen. For example, the water electrolysis stack 28 is configured with a stacked body 28a formed by stacking a plurality of water electrolysis cells (not shown in the drawings). This stacked body 28a of water electrolysis cells is electrically connected to the management system 26, and electrolyzes water by being supplied with a DC power supply from the management system 26. The water electrolysis stack 28 may be configured to generate hydrogen at normal pressure.

In the water electrolysis system 21, a circulation circuit section 30 that circulates and supplies water is connected to the water electrolysis stack 28. The circulation circuit section 30 is provided with a water circulation pipe 32, an oxygen gas-liquid separator 34, and a water circulation pump 36. The water circulation pipe 32 is connected to a floor portion of the oxygen gas-liquid separator 34 to supply water to the water electrolysis stack 28 from the oxygen gas-liquid separator 34, and also is connected to a ceiling portion of the oxygen gas-liquid separator 34 to discharge water that has been used in the water electrolysis from the water electrolysis stack 28 to the oxygen gas-liquid separator 34.

The oxygen gas-liquid separator 34 separates the liquid (water) that has flowed in through the water circulation pipe 32 from the gas (oxygen, hydrogen, and the like). A suction pipe 38, a pure water supply pipe 40, and an exhaust pipe 42 are connected to the oxygen gas-liquid separator 34.

A blower 44 is provided in the suction pipe 38. The blower 44 supplies the oxygen gas-liquid separator 34 with outside atmosphere (air) taken in from outside the facility 14. The oxygen gas-liquid separator 34 dilutes the gas (hydrogen) that has been separated, based on this air, and discharges the water that has been separated from this gas to the water circulation pipe 32. Furthermore, according to the internal pressure of the oxygen gas-liquid separator 34, the exhaust pipe 42 discharges the gas that has been diluted in the oxygen gas-liquid separator 34 to the outside of the facility 14.

The pure water supply pipe 40 is connected to water supply equipment (not shown in the drawings) to which municipal water is supplied, and includes an ion exchanger 46 therebetween. The ion exchanger 46 includes, for example, a cation exchange resin and an anion exchange resin, removes chlorine and the like contained in the municipal water to make pure water, and supplies this water (pure water) to the oxygen gas-liquid separator 34.

The water circulation pump 36 is installed in the water circulation pipe 32, downstream from the oxygen gas-liquid separator 34. The water circulation pump 36 adopts a centrifugal pump that has fins with adjustable rotational velocity, for example, and circulates the water whose flow rate has been suitably adjusted by providing the water with a flow force corresponding to the rotational velocity of the fins.

Furthermore, in the water electrolysis system 21, a high-pressure hydrogen pipe 48 is connected to the water electrolysis stack 28, to cause the produced hydrogen to flow out via this high-pressure hydrogen pipe 48. The high-pressure hydrogen pipe 48 is provided with a hydrogen gas-liquid separator 50 and an adsorption tower 52.

Hydrogen gas that contains water flows into the hydrogen gas-liquid separator 50 from the water electrolysis stack 28, via the high-pressure hydrogen pipe 48. The hydrogen gas-liquid separator 50 separates the hydrogen gas from the water therein, discharges the separated water to the outside of the facility 14, and causes the separated hydrogen gas to flow out to the adsorption tower 52.

The adsorption tower 52 includes an adsorbent (drying material) therein, and generates dry hydrogen, which is the manufactured product, by adsorbing the water that could not be separated out by the hydrogen gas-liquid separator 50. The high-pressure hydrogen pipe 48 on the downstream side of the adsorption tower 52 is connected to the pressure storage system 22, and the generated hydrogen is supplied to the pressure storage system 22.

The water electrolysis system 21 includes a hydrogen production control section 54 that suitably controls the operation of each apparatus described above. The hydrogen production control section 54 is formed in a computer that includes a processor, memory, input/output interface, and the like (not shown in the drawings). The hydrogen production control section 54 is connected to the management system 26 in a manner enabling the communication of information, via a hydrogen production connection line 56.

The pressure storage system 22 has a function to store the hydrogen (dry hydrogen) produced by the hydrogen production system 20. The pressure storage system 22 includes a pressure storage unit 58 that compresses and preserves the hydrogen and a valve unit 60 that supplies hydrogen to the pressure storage unit 58 and discharges hydrogen from the pressure storage unit 58.

The pressure storage unit 58 includes a plurality (three in FIG. 2) of tanks 62. Each tank 62 is formed as a high-pressure container that is thick enough to store the high-pressure hydrogen supplied from the hydrogen production system 20. Each tank 62 is connected to a corresponding branch pipe 63.

The valve unit 60 includes a plurality (three) valves 64 provided respectively to the branch pipes 63. Each valve 64 uses an electromagnetic valve capable of switching between being open and closed, to open and cut off the hydrogen flow path in the corresponding branch pipe 63. In this way, when the pressure of the hydrogen in a branch pipe 63 is higher than in the corresponding tank 62, hydrogen is supplied to the tank 62, and when the pressure of the hydrogen in this branch pipe 63 is lower than in the corresponding tank 62, the hydrogen is discharged from the tank 62 to the branch pipe 63.

The pressure storage system 22 includes a pressure storage control section 66 that suitably controls the operation of the valve unit 60. The pressure storage control section 66 is formed in a computer that includes a processor, memory, input/output interface, and the like (not shown in the drawings), in the same manner as the hydrogen production control section 54, and is connected to the management system 26 in a manner enabling the communication of information, via a pressure storage connection line 68. For example, the pressure storage control section 66 controls the valve unit 60 to enable the supply of hydrogen from one tank 62 to the hydrogen supply system 24 while the hydrogen of the hydrogen production system 20 is being accumulated in another tank 62.

The hydrogen supply system 24 forms a section in the main equipment 12 that supplies the hydrogen to an external target object (supplies the hydrogen to the fuel cell automobile). The hydrogen supply system 24 includes a precooler 70 that cools the hydrogen supplied from the pressure storage system 22 and a dispenser 72 that includes the filling nozzle 18 described above and directly supplies the hydrogen to the fuel cell automobile downstream from the precooler 70.

The hydrogen supply system 24 includes a supply merging pipe 74 where the plurality of branch pipes 63 of the pressure storage system 22 merge. In the precooler 70, a heat exchanger 76 is arranged in the supply merging pipe 74. The precooler 70 causes coolant to circulate between the heat exchanger 76, a coolant tank 77 that temporarily stores the coolant, and a refrigerator 78 that cools the coolant, to cool the hydrogen inside the supply merging pipe 74 with the coolant supplied to the heat exchanger 76.

The precooler 70 is provided with a precooler control section 80a that is a hydrogen supply control section 80 of the hydrogen supply system 24. The precooler control section 80a is a PLC (Programmable Logic Controller), for example, and controls the operation of the precooler 70. The precooler control section 80a is connected to the management system 26 in a manner to be able to communicate information, via a hydrogen supply connection line 82.

The dispenser 72 includes a flow rate adjusting valve that adjusts the flow rate of the hydrogen in the supply merging pipe 74, as well as the filling nozzle 18 provided downstream from the flow rate adjusting valve 84. The filling nozzle 18 is connected to a flexible hose 86 that is connected to the supply merging pipe 74, and is manipulated by being pulled out by a user or the like of the fuel cell automobile to expel the hydrogen from a filling opening (not shown in the drawings). In FIG. 2, the filling nozzle 18 pulled out by the user is shown by a two-point chain line.

The dispenser 72 is provided with a dispenser control section 80b that is the hydrogen supply control section 80 for controlling the operation of the dispenser 72. The dispenser control section 80b is a circuit board (computer) that includes a processor, memory, and input/output interface, and is connected to the management system 26 in a manner enabling the communication of information, via the hydrogen supply connection line 82.

A communication module 88 that performs near field communication (e.g., infrared communication) in accordance with a predetermined communication standard is provided inside the filling nozzle 18 of the dispenser 72. The communication module 88 forms a portion of a communication apparatus 90 that, under the control of the management system 26, performs communication (communicated filling) with the fuel cell automobile when filling the fuel cell automobile with hydrogen.

The communication apparatus 90 includes a communication converter 92 that relays communication to and from the communication module 88 described above and a communication line 93 that provides a connection between each device. Furthermore, the communication line 93 is divided into a first communication line 94 (terminal-side communication line) that provides a connection between the communication module 88 and the communication converter 92 and a second communication line 96 (base-side communication line) that provides a connection between the communication converter 92 and the management system 26.

The communication converter 92 is provided between the communication lines 93 having different standards (the first communication line 94 and the second communication line 96) to convert the signals transmitted therebetween into signals suitable for the respective communication lines during information communication. For example, the first communication line 94 provides a connection between specialized communication devices (the communication module 88 and the communication converter 92) to each other, and therefore is an RS485 cable (shield cable) with a standard for transmission with a half-duplex signal. On the other hand, the second communication line 96 provides a connection between a specialized communication device and a general use computer (the state management apparatus 98 described further below), and therefore is an RS232C cable with a standard for transmission with a serial signal. Therefore, the communication converter 92 has a function to change the signal standard (conversion between an RS485 signal and a RS232C signal).

The management system 26 of the main equipment 12 includes the state management apparatus 98, and a power distribution section 100 (power source box) that supplies power to devices 101 of each system. The hydrogen production control section 54, the pressure storage control section 66, and the hydrogen supply control section 80 (the precooler control section 80a and the dispenser control section 80b) described above are each connected to the state management apparatus 98 of the management system 26, and a plurality of sensors (hydrogen detection sensors and the like) not shown in the drawings that are installed in the facility 14 are also connected to the state management apparatus 98. The sensors are provided at predetermined locations in each system.

Figure 3:
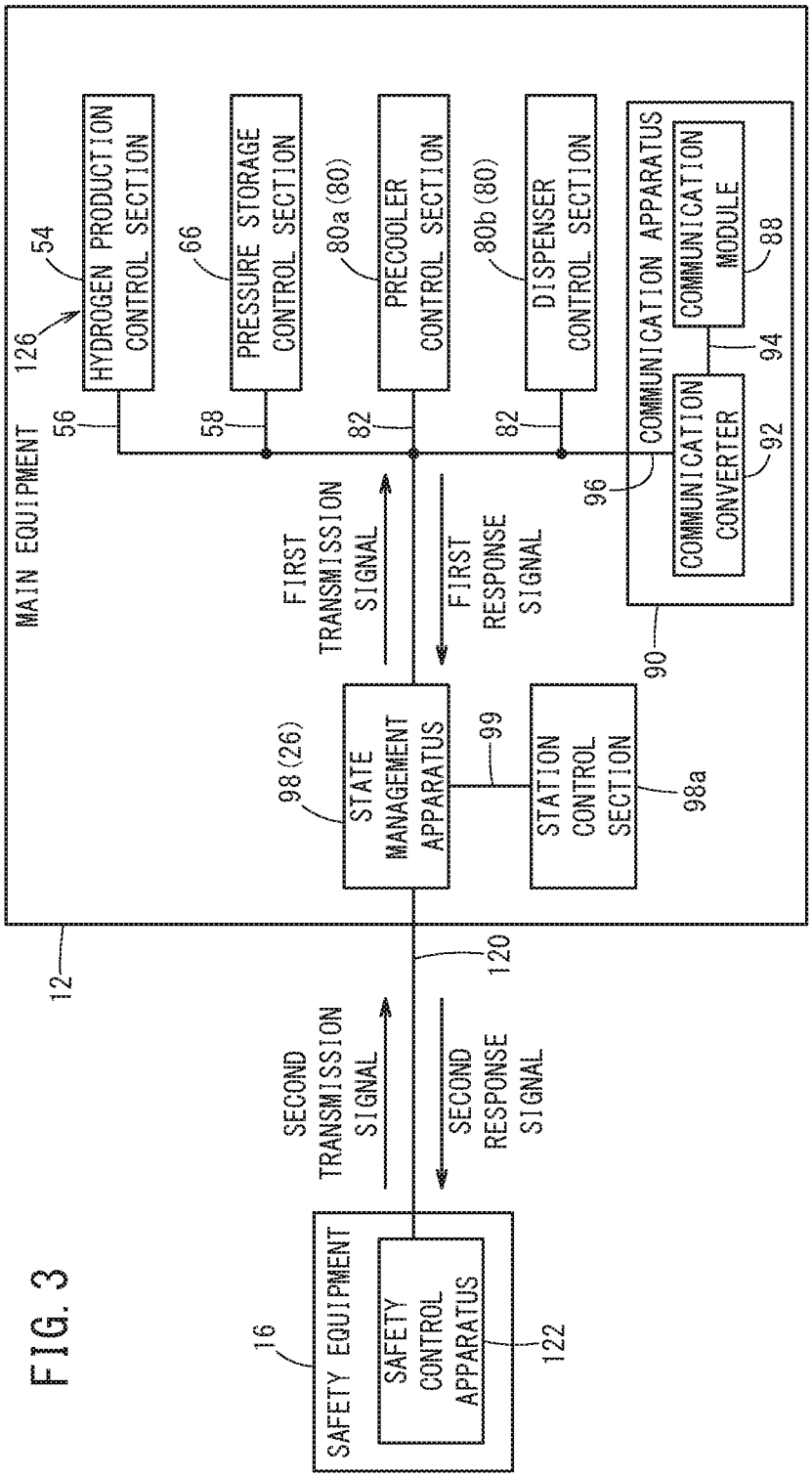
FIG. 3 is a block diagram showing the transmission and reception of signals between the state management apparatus of the main equipment and the safety control apparatus of the safety equipment.

The state management apparatus 98 is formed as a computer (including a PLC) that includes a processor, memory, and input/output interface (not shown in the drawings). As shown in FIG. 3, the state management apparatus 98 is connected to a station control section 98a that is manipulated by a user of the fuel cell automobile when supplying hydrogen to the fuel cell automobile, via an Ethernet (Registered Trademark) cable 99 connected to the input/output interface.

The station control section 98a displays the information necessary for the hydrogen filling, and has a function to manage the amount of hydrogen supplied during the hydrogen filling. For example, the user of the fuel cell automobile suitably manipulates a displayed manipulation portion (not shown in the drawings) of the station control section 98a to perform settings for the hydrogen filling. The station control section 98a suitably calculates the amount of hydrogen gas to be supplied, based on this setting content and the communicated filling in the communication apparatus 90 during the hydrogen filling. The hydrogen supply control section 80 adjusts the amount of supplied hydrogen by operating the precooler 70 and the dispenser 72, according to instructions from the station control section 98a.

The state management apparatus 98 functions as a master ECU that manages the state of each section of the hydrogen station 10 during normal operation (correct operation), by having a processor execute a program (not shown in the drawings) stored in a memory. In contrast to this, the control sections of each system (the hydrogen production control section 54, pressure storage control section 66, precooler control section 80a, dispenser control section 80b, and station control section 98a) function as slave ECUs that are managed by the state management apparatus 98.

In particular, the state management apparatus 98 according to the present embodiment performs processing dedicated to communication during the communicated filling of the communication apparatus 90 and the detection values of the sensors in the facility 14, to implement traffic control with a low amount of work. In this way, the state management apparatus 98 is configured to perform management of only the state transition of each system, without issuing instructions to the control section of each system. For example, the detection values of the sensors are transmitted to the safety equipment 16 from the state management apparatus 98 and used to control the safety equipment 16 (a safety control apparatus 122 described further below), and the signals of the communication module 88 are transmitted from the state management apparatus 98 to the station control section 98a.

The power distribution section 100 of the management system 26 relays the power supply from the safety equipment 16 to the main equipment 12, and suitably distributes the power to be supplied to each system of the main equipment 12. For example, the power distribution section 100 includes a power control unit (PCU) 100a that actually performs the distribution of power to the devices 101 of each system and a converter 100b (referred to below as a down converter unit (DCU) 100b) that converts (drops) the power supplied from the safety equipment 16 to a suitable power (see FIG. 1). The power distribution section 100 may have a function to switch between supplying power from and stopping the supply of power from the power source, according to instructions from the state management apparatus 98 or the safety equipment 16.

Returning to FIG. 1, the main equipment 12 of the hydrogen station 10 includes a rectangular frame structure 102 that positions and secures each system described above (or the devices 101 forming the systems) in unit groups. Specifically, the hydrogen production system 20, the pressure storage system 22 (pressure storage unit 58 and valve unit 60), and the hydrogen supply system 24 (precooler 70 and dispenser 72) are arranged in the frame structure 102 to occupy a predetermined region in the main equipment 12. Furthermore, an electrical equipment section 104 is provided at one end of the frame structure 102 in the longitudinal direction. The plurality of control sections (hydrogen production control section 54, pressure storage control section 66, precooler control section 80a, dispenser control section 80b, and the like), the state management apparatus 98, and the power distribution section 100 are arranged in the electrical equipment section 104.

Specifically, the units of each system are divided into two blocks (first and second blocks 102a and 102b) that sandwich the substantially central portion of the frame structure 102 in the transverse direction. The dispenser 72, the valve unit 60, the hydrogen production system 20, and one portion of the electrical equipment section 104 are arranged in the stated order in the first block 102a, from one corner in the longitudinal direction to another corner in the longitudinal direction. Furthermore, in the second block 102b, the precooler 70 is arranged at a position adjacent to the dispenser 72, and the pressure storage unit 58 is arranged at a position adjacent to the valve unit 60 and the water electrolysis system 21. The other portion of the electrical equipment section 104 is arranged to be adjacent to the one portion of the electrical equipment section 104.

The electrical equipment section 104 on the first block 102a side is housed together with each control component of the hydrogen station 10, thereby being distanced from the devices 101 that directly handle the hydrogen and making it as difficult as possible for these components to be affected by the hydrogen. For example, a ventilation apparatus 106 is provided in the electrical equipment section 104, and a partition wall 108 is provided at a boundary between the electrical equipment section 104 and the hydrogen production system 20. The ventilation apparatus 106 takes in air from outside the facility 14, to cause the air to flow along the electrical equipment section 104 and the hydrogen production system 20 in the stated order. In this way, the main equipment 12 prevents the hydrogen from flowing from the hydrogen production system 20 over the partition wall 108 to the electrical equipment section 104.

The electrical equipment section 104 on the first block 102a side has first to third storage sections 110, 112, and 114 set above the ventilation apparatus 106. More specifically, the hydrogen production control section 54 is housed in the first storage section 110, the pressure storage control section 66, and the hydrogen supply control section 80 (precooler control section 80a and dispenser control section 80b) are housed in the second storage section 112. The first and second storage sections 110 and 112 respectively include boxes 110a and 112a, and the control sections are respectively housed in these boxes 110a and 112a. The boxes 110a and 112a may include shielding plates that block electromagnetic noise.

Figure 4:
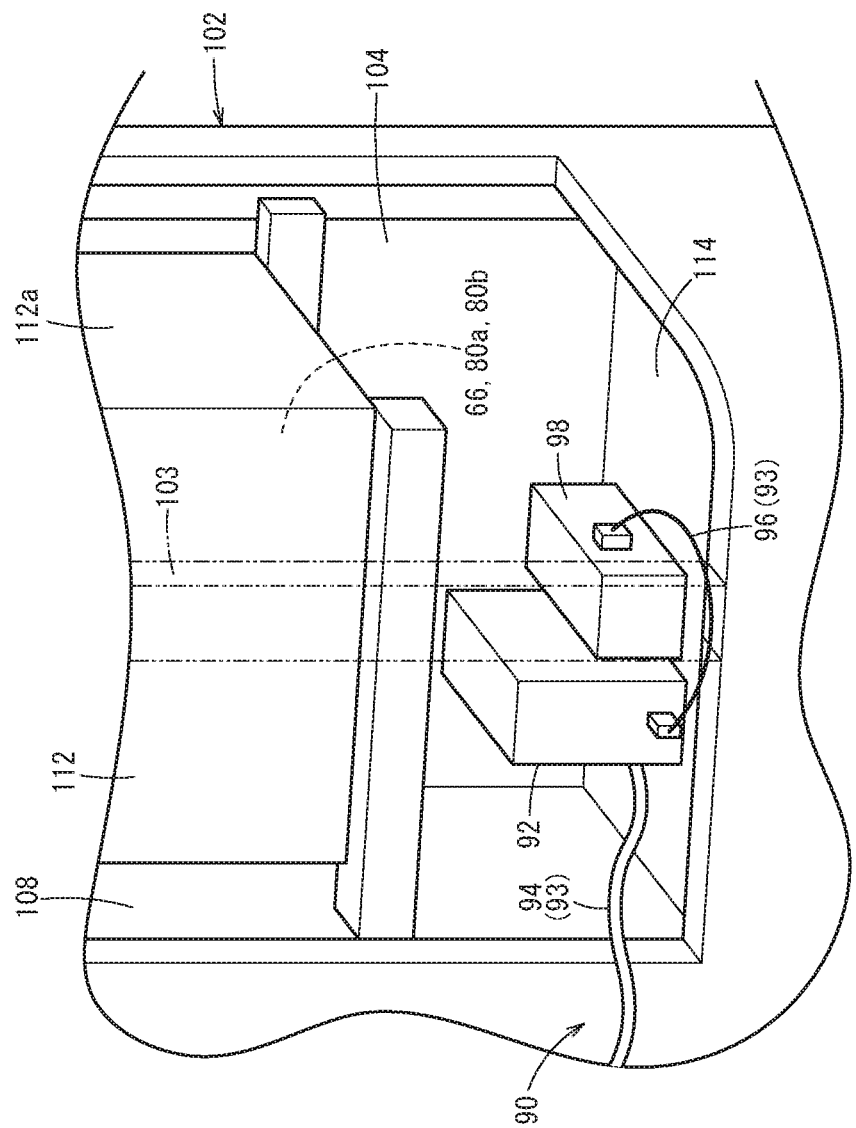
FIG. 4 is a partial perspective diagram showing an enlarged view of the installation locations of the state management apparatus and the communication converter.

The communication converter 92 and the state management apparatus 98 are arranged in the third storage section 114. The third storage section 114 does not include a box, so the communication converter 92 and the state management apparatus 98 are exposed. As shown in FIG. 4, the state management apparatus 98 and the communication converter 92 are arranged at positions near (adjacent to) each other. In other words, the second communication line 96 connecting the communication converter 92 and the state management apparatus 98 extends a distance that is sufficiently shorter than the extension distance of the first communication line 94. Furthermore, the communication converter 92 and the state management apparatus 98 are connected to the same ground position of the frame structure 102. This ground position is different from the ground position of the hydrogen production control section 54, the pressure storage control section 66, and the hydrogen supply control section 80.

As an example, the first communication line 94 reaches the communication converter 92 of the electrical equipment section 104 at a position on the side opposite the location where the filling nozzle 18 is provided, from the communication module 88 provided at the tip of the filling nozzle 18, through the inside of the flexible hose 86, and a predetermined location of the main equipment 12. On the other hand, the second communication line 96 is connected to a connector on a side surface of the communication converter 92, and wraps around a vertical frame 103 to connect to a predetermined position of the state management apparatus 98, in a manner to circumvent another harness (not shown in the drawings) provided to the vertical frame 103 of the frame structure 102.

As described above, the communication apparatus 90 of the hydrogen station 10 adopts the RS485 standard for the first communication line 94 and adopts the RS232C standard for the second communication line 96. Therefore, the first communication line 94 has a high electromagnetic noise shielding capability, while the second communication line 96 has a low electromagnetic noise shielding capability. Furthermore, the second communication line 96 is set to have a lower electromagnetic noise shielding capability than the connection lines (hydrogen production connection line 56, pressure storage connection line 68, and hydrogen supply connection line 82) connecting the state management apparatus 98 and the control sections (hydrogen production control section 54, pressure storage control section 66, and hydrogen supply control section 80) to each other. For example, the hydrogen production connection line 56, the pressure storage connection line 68, and the hydrogen supply connection line 82 are Ethernet (Registered Trademark) cables (e.g., CC-Link Ver. 1.1 cables), in order to ensure a certain amount of information communication.

Accordingly, by setting the total length (extension length) of the second communication line 96 to be short, the hydrogen station 10 restricts noise from occurring in the signals passing through the second communication line 96. In particular, the distance between the state management apparatus 98 and the communication converter 92 is less than the distance between the hydrogen production control section 54 (first storage section 110) and the state management apparatus 98, less than the distance between the state management apparatus 98 and the pressure storage control section 66, and also less than the distance between the state management apparatus 98 and the hydrogen supply control section 80 (second storage section 112). In other words, since the physical distance is sufficiently short, the noise occurring through the ground lines passing through the electrical equipment section 104 and the boxes 110*a* and 112*a* of the electrical equipment section 104 are reduced. The third storage section 114 (space) in which the communication converter 92 and the state management apparatus 98 are housed may be covered with a shielding plate or the like that blocks out electromagnetic noise. In this way, noise is even less likely to occur in the second communication line 96.

Furthermore, the power distribution section 100 of the management system 26 is mostly arranged in the electrical equipment section 104 on the second block 102*b* side. For example, the PCU 100*a* is arranged in an upper portion, and the DCU 100*b* is arranged below the PCU 100*a*.

Returning to FIG. 1 and FIG. 2, the safety equipment 16 is formed separately from the main equipment 12, and housed in a housing 116 provided at a position distanced from the facility 14. The safety equipment 16 is electrically connected to the main equipment 12 via a power line 118, and is connected to the main equipment 12 in a manner enabling the communication of information via an inter-facility communication line 120. Furthermore, the safety equipment 16 is connected to external power transmission equipment (not shown in the drawings) that supplies power to the hydrogen station 10, and has a function to draw out the power supplied to the main equipment 12. The safety control apparatus 122, an emergency power storage battery 124, and an AC/DC converter (not shown in the drawings) are provided inside the safety equipment 16. The AC/DC converter converts the AC power supply of the power transmission equipment into a DC power supply. The main equipment 12 and the safety equipment 16 may be provided in the same facility 14.

The safety control apparatus 122 monitors the amount of power supplied from the power transmission equipment to the main equipment 12, and also suitably distributes the power to the emergency power storage battery 124. For example, when the power of the power transmission equipment is stopped (power stoppage), the safety control apparatus 122 automatically supplies power to the main equipment 12 from the emergency power storage battery 124. The safety equipment 16 may receive a power supply from renewable energy equipment (not shown in the drawings) such as solar power, wind power, or geothermal power equipment, and supply this power to the main equipment 12. As an example, the safety equipment 16 can be configured to perform charging of the emergency power storage battery 124 along with the supply of power to the main equipment 12 during day time when there is enough energy from the renewable energy equipment, and perform the supply of power to the main equipment 12 by discharging power from the emergency power storage battery 124 during night time when the amount of power from the renewable energy equipment is low.

Furthermore, the safety control apparatus 122 has a function to monitor the hydrogen concentration inside the facility 14 by receiving the detection values of the sensors of the main equipment 12 from the state management apparatus 98 and to cut off the supply of power to the main equipment 12 if the hydrogen concentration becomes greater than or equal to a predetermined value.

As shown in FIG. 3, in the main equipment 12 of the hydrogen station 10 according to the present embodiment, the state management apparatus 98 is configured to perform first watchdog control of the hydrogen production control section 54, the pressure storage control section 66, the hydrogen supply control section 80 (precooler control section 80*a* and dispenser control section 80*b*), and the communication apparatus 90. Furthermore, the safety control apparatus 122 of the safety equipment 16 is configured to perform second watchdog control of the state management apparatus 98 of the main equipment 12.

Specifically, in accordance with the implementation of the first watchdog control, the state management apparatus 98 transmits a first transmission signal to the hydrogen production control section 54, the pressure storage control section 66, the precooler control section 80*a*, the dispenser control section 80*b*, and the communication apparatus 90 (referred to below collectively as "each control section 126"). The first transmission signal has a square waveform that rises (or falls) every predetermined interval, i.e., the first transmission signal is a pulse signal.

A processing routine for clearing a pulse signal counter, when the first transmission signal is received, is incorporated in advance in a program of each control section 126 connected to the state management apparatus 98. Accordingly, if the process for clearing the pulse signal counter is performed, each control section 126 is operating correctly, and a first response signal (high level: 1) is returned to the state management apparatus 98 during correct operation. In this way, the state management apparatus 98 can recognize that each control section 126 is operating correctly.

Furthermore, the program of each control section 126 has a watchdog timer set therein, and can recognize that abnormal operation is occurring if the counter is not cleared during the interval of the watchdog timer. The state management apparatus 98 according to the present embodiment is configured to, if abnormal operation is recognized in any one of the control sections 126 based on the first response signal (low level: 0) from this control section 126, perform a process to cut off the supply of power from the power distribution section 100 to the hydrogen production system 20.

In this way, the hydrogen station 10 immediately stops the hydrogen production of the hydrogen production system 20. On the other hand, the main equipment 12 itself can continue operating, and a safety function in the facility 14 (such as detection of hydrogen by a hydrogen detection sensor) can be utilized. The state management apparatus 98 may be configured to not only cut off the supply of power to the hydrogen production system 20 when abnormal operation is recognized, but to also cut off the supply of power to the system in which the abnormal operation was recognized (excluding a case where the abnormal operation occurred in the hydrogen production system 20).

A control section in which abnormal operation has been recognized based on the first transmission signal, among the control sections 126, may automatically reset the process currently being performed to perform a restart. In this way, the control section can possibly return to correct operation, and then can output information to the state management apparatus 98 indicating that the control section has returned to correct operation. If the control section in which abnormal operation occurred has returned to correct operation, the state management apparatus 98 may perform a process to restart the supply of power to the hydrogen production system 20. On the other hand, if this control section has not returned to correct operation, the supply of power to the hydrogen production system 20 remains in the cutoff state, and the supply of power to the system exhibiting abnormal operation is cut off. Furthermore, the hydrogen station 10 issues a warning to a manager.

On the other hand, in accordance with the second watchdog control, the safety control apparatus 122 of the safety equipment 16 transmits a second transmission signal to the state management apparatus 98. The second transmission signal has a square waveform that rises (or falls) at shorter intervals than the rising interval of the first transmission signal, i.e., the second transmission signal is a pulse signal.

A processing routine for clearing a pulse signal counter, when the second transmission signal is received, is incorporated in advance in a program of the state management apparatus 98. Specifically, if the process for clearing the second transmission signal counter is performed, the state management apparatus 98 is operating correctly, and the state management apparatus 98 outputs a second response signal (high level: 1) to the safety control apparatus 122 during correct operation. In this way, the safety control apparatus 122 can recognize that the state management apparatus 98 is operating correctly.

Furthermore, the program of the state management apparatus 98 has a watchdog timer set therein, and can recognize that abnormal operation is occurring if the counter is not cleared during the interval of the watchdog timer. The safety control apparatus 122 is configured to, if abnormal operation is recognized based on a second response signal (low level: 0) from the state management apparatus 98, perform a process to cut off the supply of power to the main equipment 12.

In this way, even if each control section 126 is operating correctly according to the first watchdog control, the hydrogen station 10 can cut of the supply of power to the main equipment 12 to stop the operation. As described above, the state management apparatus 98 monitors the state transition of each system (each control section 126) and transmits the detection values of the sensors to the safety control apparatus 122. Therefore, when the state management apparatus 98 operates abnormally, the reliability of the information indicating the state transition of each system drops. Accordingly, the safety control apparatus 122 temporarily cuts off the supply of power to the main equipment 12 and issues a warning to the manager of the hydrogen station 10.

The state management apparatus 98 in which abnormal operation has been recognized may automatically reset the process currently being performed to perform a restart. In this way, the state management apparatus 98 can possibly return to correct operation, and then can output information to the safety control apparatus 122 indicating that the state management apparatus 98 has returned to correct operation. The safety control apparatus 122 may be configured to resume the supply of power to the main equipment 12 when the state management apparatus 98 has returned to the correct operation.

The hydrogen station 10 according to the present embodiment is basically configured as described above, and the following describes the operation thereof.

The main equipment 12 of the hydrogen station 10 produces hydrogen with the hydrogen production system 20 and stores the produced hydrogen in the pressure storage system 22, based on the power supplied from the safety equipment 16. When a request for hydrogen (manipulation of the filling nozzle 18) is made by a user, the main equipment 12 supplies the hydrogen to the fuel cell automobile according to the operation of the pressure storage system 22 and the hydrogen supply system 24. Then, the state management apparatus 98 of the main equipment 12 operates due to the power supply of the safety equipment 16 to manage the transition state of each system during correct operation.

Figure 5B:
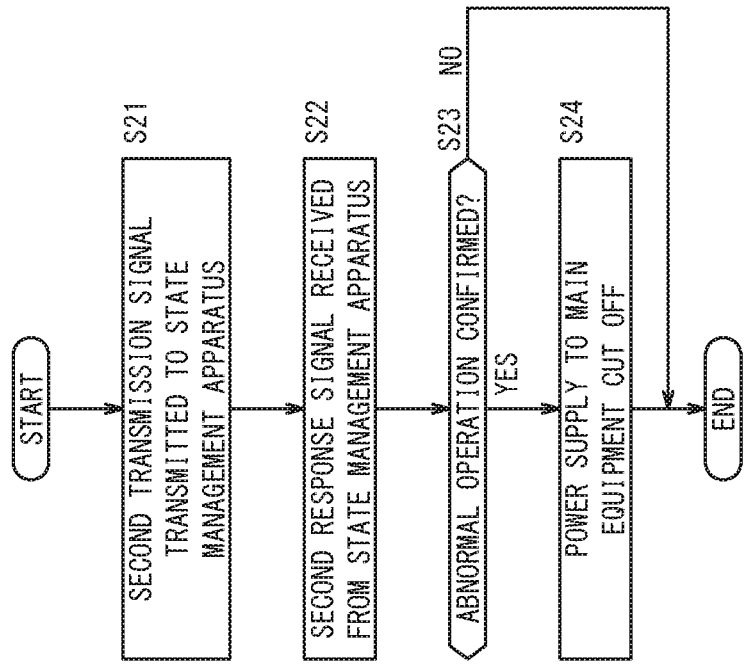
FIG. 5B is a flow chart showing the processes of the second watchdog control.
Figure 5A:
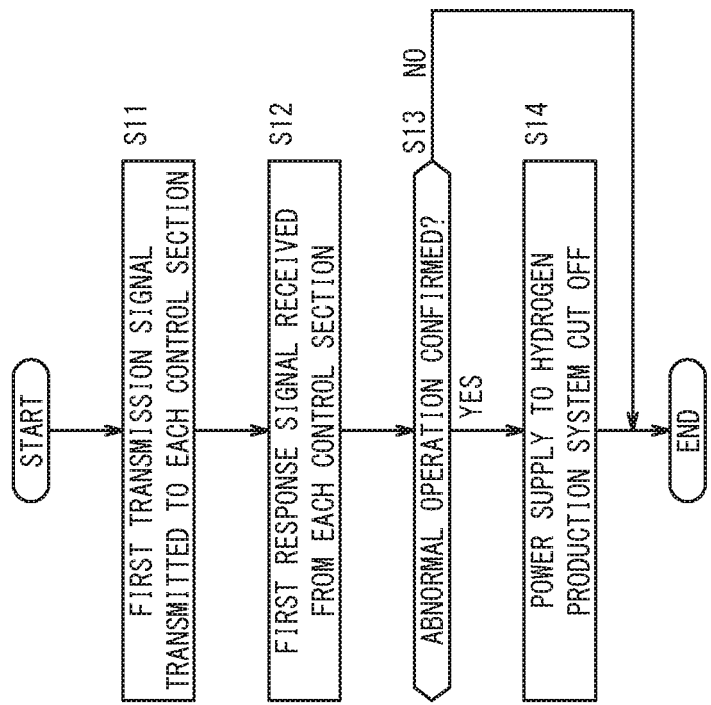
FIG. 5A is a flow chart showing the processes of the first watchdog control.

As shown in FIG. 5A, the state management apparatus 98 implements the first watchdog control to recognize the operation of each control section 126. Similarly, as shown in FIG. 5B, the safety control apparatus 122 implements the second watchdog control to recognize the operation of the state management apparatus 98.

Specifically, in the first watchdog control, the state management apparatus 98 transmits the first transmission signal to each control section 126 (the hydrogen production control section 54, pressure storage control section 66, precooler control section 80a, dispenser control section 80b, and communication apparatus 90) (step S11). Upon receiving the first transmission signal, each control section 126 clears the counter if correct operation is being performed, and outputs the first response signal (high level: 1) indicating correct operation to the state management apparatus 98. Also, each control section 126 increments the counter during the interval of the watchdog timer, and outputs a first response signal (low level: 0) indicating abnormal operation to the state management apparatus 98 if the counter is not cleared.

Here, the communication lines 93 (first communication line 94 and second communication line 96) are provided between the communication apparatus 90 and the state management apparatus 98, and the electromagnetic noise shielding capability is sufficiently increased, as described above. Therefore, it is possible to reliably recognize the operation of the communication apparatus 90 (communication module 88) without noise occurring in the transmission or reception of the first transmission signal or first response signal.

The state management apparatus 98 recognizes correct operation or abnormal operation of each control section 126 (step S13) by receiving the first response signal (step S12). Specifically, if abnormal operation is recognized (e.g., if a high level signal is not received during a predetermined interval), the process moves to step S14. On the other hand, if correct operation is recognized (if a high level is received), the process skips step S14 and the process flow of the current first watchdog control ends.

At step S14, the state management apparatus 98 controls the power distribution section 100 to cut off the supply of power to the hydrogen production system 20. In this way, the production of hydrogen in the facility 14 is stopped, and the hydrogen does not excessively increase. Furthermore, although the state management apparatus 98 stops the operation of the hydrogen production system 20, the other systems and sensors of the main equipment 12 continue to operate, and therefore it is possible for the manager of the hydrogen station 10 to easily understand the state within the facility 14, for example, via the station control section 98*a*. After the process of step S14, the state management apparatus 98 ends the process flow of the current first watchdog control.

In the second watchdog control, the safety control apparatus 122 transmits the second transmission signal to the state management apparatus 98 (step S21). Upon receiving this second transmission signal, the state management apparatus 98 clears the counter if correct operation is being performed, and outputs the second response signal (high level: 1) indicating correct operation to the safety control apparatus 122. Also, the state management apparatus 98 increments the counter during the interval of the watchdog timer, and outputs a second response signal (low level: 0) indicating abnormal operation to the safety control apparatus 122 if the counter is not cleared.

The safety control apparatus 122 recognizes correct operation or abnormal operation of the state management apparatus 98 (step S23) by receiving the second response signal (step S22). At step S23, if abnormal operation is recognized (e.g., if a high level signal is not received during a predetermined interval), the process moves to step S24. If correct operation is recognized (if a high level is received), the process skips step S24 and the process flow of the current second watchdog control ends.

At step S24, the safety control apparatus 122 cuts off the supply of power to the main equipment 12 in the safety equipment 16. At this time, even if each control section 126 is operating correctly according to the first watchdog control, the cutoff of the power supply to the main equipment 12 is prioritized. In this way, the supply of power to the main equipment 12 is stopped, thereby stopping the handling of hydrogen in the main equipment 12. As a result, the electrical contact with the hydrogen in the facility 14 ends, and the manager of the hydrogen station 10 can safely inspect or check the main equipment 12 including the state management apparatus 98. After the process of step S24, the safety control apparatus 122 ends the process flow of the current second watchdog control.

The hydrogen station 10 according to the present embodiment described above achieves the effects described below.

When an abnormality is recognized with the second watchdog control of the safety control apparatus 122, the hydrogen station 10 is configured to cut off the power supply from the safety control apparatus 122 to the main equipment 12, even if the first watchdog control of the state management apparatus 98 indicates correct operation. In other words, if the state management apparatus 98 that manages the state of each system handling the hydrogen is not operating correctly, the hydrogen station 10 forcefully stops the operation of the main equipment 12, since the reliability of the state management of each system cannot be ensured. In this way, the hydrogen station 10 makes it possible to prohibit the production, supply, and the like of hydrogen, thereby enabling suitable measures such as decreasing the possibility of hydrogen leaking to the outside, preventing electrical contact with the hydrogen in the main equipment 12, and the like.

Furthermore, if an abnormality is recognized in any of the plurality of systems by the first watchdog control, the state management apparatus 98 is configured to cut off the power supply to the system in which the abnormality is recognized, even if the second watchdog control indicates correct operation. In this way, the hydrogen station 10 immediately stops the operation of the system in which an abnormality is detected, and can therefore prevent this abnormal system from handling hydrogen.

Yet further, the plurality of systems include the hydrogen production system 20 configured to produce the hydrogen, and if an abnormality is recognized in any of the plurality of systems by the first watchdog control, the state management apparatus 98 is configured to cut off the power supply to the hydrogen production system 20 even if the second watchdog control indicates correct operation. In this way, the hydrogen station 10 makes the safety function such as the detection of the hydrogen concentration in the main equipment 12 more effective, by stopping the hydrogen production system 20 without stopping the power supply to the main equipment 12. Accordingly, it is possible to ensure the safety of workers and also to restrict rising power of a system when returning to correct operation.

Here, the hydrogen production system 20 is a water electrolysis system 21 configured to produce hydrogen by electrolyzing water, and the plurality of systems include the hydrogen supply system 24 configured to supply the target object (fuel cell automobile) with the hydrogen produced by the water electrolysis system 21 and the communication apparatus 90 configured to communicate with the target object during supply of the hydrogen. In this way, the hydrogen station 10 can consistently produce hydrogen and supply hydrogen, and can suitably adjust the amount of hydrogen supplied by performing communication using the communication apparatus 90 when supplying the hydrogen to the fuel cell automobile. Even with such a consistent system, it is possible to take suitable measures in response to system abnormalities, using the first and second watchdog controls.

The state management apparatus 98 is connected to the station control section 98*a* configured to control the amount of hydrogen supplied to the target object (fuel cell automobile) based on the manipulation by the user, and the state management apparatus is configured to provide the station control section 98*a* with the communication information of the communication apparatus 90 during the supply of the hydrogen. The hydrogen station 10 can significantly reduce the amount of work performed by the state management apparatus 98, by controlling the amount of hydrogen supplied using the station control section 98*a* connected to the state management apparatus 98. Accordingly, the state management apparatus 98 can implement traffic control of the plurality of systems with a low load.

Furthermore, the hydrogen station 10 includes the hydrogen production control section 54 configured to control the operation of the hydrogen production system 20 and the hydrogen supply control section 80 configured to control the operation of the hydrogen supply system 24, the communication apparatus 90 includes the communication converter 92 configured to convert communication signals, the base-side communication line (second communication line 96) that connects the communication converter 92 and the state management apparatus 98 has lower electromagnetic noise shielding capability than the hydrogen production connection line 56 that connects the hydrogen production control section 54 and the state management apparatus 98 and the hydrogen supply connection line 82 that connects the hydrogen supply control section 80 and the state management apparatus 98, and the communication converter 92 is provided at a position closer to the state management apparatus 98 than the hydrogen production control section 54 and the hydrogen supply control section 80. Therefore, the hydrogen station 10 can make the second communication line 96 connecting the communication converter 92 and the state management apparatus 98 as short as possible, so it is possible to restrict the decrease in accuracy of the first watchdog control even through the second communication line 96 has a low electromagnetic noise shielding capability. Furthermore, it is possible to reduce the effect of noise during communication (communicated filling) when the hydrogen is being supplied.

In addition to the above configuration, the communication apparatus 90 includes the communication module 88 configured to perform near field wireless communication with the target object (fuel cell automobile), and the extension length of the base-side communication line (second communication line 96) is less than the extension length of the terminal-side communication line (first communication line 94) that connects the communication module 88 and the communication converter 92. In this way, since communication is performed over only a short distance in the second communication line 96 having a low electromagnetic noise shielding capability, the communication apparatus 90 can restrict the noise during communication more reliably.

Yet further, the communication converter 92 and the state management apparatus 98 are arranged in the third storage section 114, which is different from the first storage section 110 where the hydrogen production control section 54 is housed and the second storage section 112 where the hydrogen supply control section 80 is housed, and the first and second storage sections 110 and 112 are arranged at positions near the third storage section 114 and distanced from the communication converter 92 and the state management apparatus 98. The hydrogen station 10 can reduce the effect of noise by having the communication converter 92 and the state management apparatus 98 arranged in the same third storage section 114. Furthermore, by arranging the first and second storage sections 110 and 112 at positions near each other and distanced from the communication converter 92 and the state management apparatus 98, the third storage section 114 can significantly restrict the electromagnetic noise in the second communication line 96 due to the first and second storage sections 110 and 112.

The present invention is not limited to the above embodiments, and various alterations can be made without deviating from the scope of the present invention. For example, in the embodiment described above, the hydrogen station 10 includes all of the hydrogen production system 20, the pressure storage system 22, and the hydrogen supply system 24. However, the main equipment 12 of the hydrogen station 10 only needs to include a device that handles hydrogen, and only needs to include one of the systems described above. As an example, the hydrogen station 10 may be configured to include only the hydrogen production system 20 and to use the produced hydrogen for another purpose, or may be configured to include only the hydrogen supply system 24 and the receive the supply of hydrogen from another location.

When there is an abnormal operation according to the second watchdog control performed by the safety control apparatus 122, the state management apparatus 98 may shut down the power distribution section 100 by automatically stopping the operation regardless of the cutoff control of the safety control apparatus 122.

Furthermore, when an abnormal operation is recognized in a system other than the hydrogen production system 20 by the first watchdog control, instead of cutting off the power supply to the hydrogen production system 20, the state management apparatus 98 may stop only the operation of the apparatus in which the abnormal operation is recognized.

What is claimed is:

1. A hydrogen station that includes main equipment having a plurality of systems that handle hydrogen, the hydrogen station comprising:
   a power distribution section equipped inside a housing and configured to distribute power to be supplied to each of the plurality of systems;
   a state management apparatus equipped inside the housing, connected to each of the plurality of systems and configured to manage the states of the plurality of systems; and
   a safety control apparatus equipped outside the housing, formed separately from the main equipment, connected to the state management apparatus, and configured to supply power to the main equipment,
   wherein the plurality of systems are equipped inside the housing, and include a hydrogen production system configured to produce hydrogen, a pressure storage system configured to store produced hydrogen and a hydrogen supply system configured to supply stored hydrogen to a target object,
   the state management apparatus is configured to perform first watchdog control to check operations of the plurality of systems, and the safety control apparatus is configured to perform second watchdog control to check an operation of the state management apparatus, and
   the state management apparatus or the safety control apparatus is configured to cut off the power supply from the safety control apparatus to the main equipment if an abnormality is recognized by the second watchdog control, even if the first watchdog control indicates correct operation, and to switch the power distribution section to cut off the power supply to the hydrogen supply system if an abnormality is recognized in any of the plurality of systems by the first watchdog control, even if the second watchdog control indicates correct operation.

2. The hydrogen station according to claim 1, wherein if an abnormality is recognized in any of the plurality of systems by the first watchdog control, the state management apparatus is configured to cut off the power supply to the system in which the abnormality is recognized, even if the second watchdog control indicates correct operation.

3. The hydrogen station according to claim 1, wherein the hydrogen production system is a water electrolysis system configured to produce hydrogen by electrolyzing water, and
   the plurality of systems further include a communication apparatus configured to communicate with the target object during supply of the hydrogen.

4. The hydrogen station according to claim 3, wherein the state management apparatus is connected to a station control section configured to control an amount of hydrogen supplied to the target object based on a manipulation by a user, and
   the state management apparatus is configured to provide the station control section with communication information of the communication apparatus during the supply of the hydrogen.

5. The hydrogen station according to claim 3, further comprising:
   a hydrogen production control section configured to control an operation of the hydrogen production system; and a hydrogen supply control section configured to control an operation of the hydrogen supply system, wherein the communication apparatus includes a communication converter configured to convert communication signals, a base-side communication line that connects the communication converter and the state management apparatus has a lower electromagnetic noise shielding capability than a hydrogen production connection line that connects the hydrogen production control section and the state management apparatus and a hydrogen supply connection line that connects the hydrogen supply control section and the state management apparatus, and the communication converter is provided at a position closer to the state management apparatus than the hydrogen production control section and the hydrogen supply control section.

6. The hydrogen station according to claim 5, wherein
the communication apparatus includes a communication module configured to perform near field wireless communication with the target object, and
an extension length of the base-side communication line is less than an extension length of a terminal-side communication line that connects the communication module and the communication converter.

7. The hydrogen station according to claim 5, wherein
the communication converter and the state management apparatus are arranged in a third storage section, which is different from a first storage section where the hydrogen production control section is housed and a second storage section where the hydrogen supply control section is housed, and
the first and second storage sections are arranged at positions near the third storage section and distanced from the communication converter and the state management apparatus.

* * * * *